United States Patent
Ungar et al.

(10) Patent No.: US 10,671,621 B2
(45) Date of Patent: Jun. 2, 2020

(54) PREDICTIVE SCALING FOR CLOUD APPLICATIONS

(71) Applicant: Microsoft Technology Licensing, LLC, Redmond, WA (US)

(72) Inventors: Adam Ungar, Tel-Aviv (IL); Benjamin Mark Zhitomirsky, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 15/836,656

(22) Filed: Dec. 8, 2017

(65) Prior Publication Data

US 2019/0179944 A1 Jun. 13, 2019

(51) Int. Cl.
*H04L 12/24* (2006.01)
*G06F 16/2458* (2019.01)
*H04L 29/08* (2006.01)

(52) U.S. Cl.
CPC ...... *G06F 16/2465* (2019.01); *H04L 41/0896* (2013.01); *H04L 41/142* (2013.01);
(Continued)

(58) Field of Classification Search
CPC ............. G06F 16/2465; G06F 2216/03; H04L 41/0896; H04L 41/142; H04L 41/147;
(Continued)

(56) References Cited

U.S. PATENT DOCUMENTS 9,462,427 B2 10/2016 Patel et al.
9,590,879 B2 3/2017 Wray
(Continued)

FOREIGN PATENT DOCUMENTS

CN 102365630 A 2/2012

OTHER PUBLICATIONS

Buyya, et al., "InterCloud: Utility-Oriented Federation of Cloud Computing Environments for Scaling of Application Services", In Proceedings of International Conference on Algorithms and Architectures for Parallel Processing, May 21, 2010, 20 pages.
(Continued)

*Primary Examiner* — Irete F Ehichioya
*Assistant Examiner* — Xiaoqin Hu

(57) ABSTRACT

A compute cloud hosts a distributed application and is configured to add or remove instances of the application at datacenters at disperse geographic regions. Operations of the application are captured in a telemetry stream. Each record in the telemetry stream indicates a time, client location, and performance measure for a corresponding client request. After pre-processing such as rounding the times, the telemetry records are passed to a frequent itemset mining algorithm that identifies frequent time-location pairs in the telemetry stream. The frequent time-location pairs are consolidated into encompassing frequent region time-range pairs. An aggregate performance measure is computed from the performance measures of the telemetry records that match a frequent region time-range pair. A recommended region and time for adding or removing instances of the application is computed based on the aggregate performance measure and the region time-range pair.

20 Claims, 8 Drawing Sheets

(52) U.S. Cl.
CPC ............ *H04L 41/147* (2013.01); *H04L 41/22* (2013.01); *H04L 41/5096* (2013.01); *H04L 67/1097* (2013.01); *G06F 2216/03* (2013.01)

(58) Field of Classification Search
CPC .. H04L 41/22; H04L 41/5096; H04L 67/1097
See application file for complete search history.

(56) References Cited

U.S. PATENT DOCUMENTS

| | | | |
|---|---|---|---|
| 2006/0036729 A1* | 2/2006 | Sakaguchi | H04L 43/02 709/224 |
| 2012/0239739 A1 | 9/2012 | Manglik et al. | |
| 2014/0068073 A1 | 3/2014 | Peles et al. | |
| 2014/0279201 A1 | 9/2014 | Iyoob et al. | |
| 2015/0278061 A1 | 10/2015 | Siciliano et al. | |
| 2017/0083708 A1* | 3/2017 | Braghin | G06F 16/2365 |
| 2018/0276063 A1* | 9/2018 | Mendes | G06F 11/0793 |
| 2018/0287907 A1* | 10/2018 | Kulshreshtha | G06F 11/3495 |

OTHER PUBLICATIONS

Shen, et al., "CloudScale: Elastic Resource Scaling for Multi-Tenant Cloud Systems", In Proceedings of the 2nd ACM Symposium on Cloud Computing, Oct. 27, 2011, pp. 1-14.

\* cited by examiner

_164_

TIME-REGION PREDICTION OUTPUT UI

REGION 1

| TIME | RECOMMENDED INSTANCES |
|---|---|
| 1:05 | +1 |
| 1:14 | -1 |
| 1:30 | -2 |
| 4:15 | +4 |
| 5:00 | +1 |
| 6:47 | -6 |
| 6:55 | -1 |
| 8:32 | +1 |
| ... | ... |

230

REGION 3

| TIME | RECOMMENDED INSTANCES |
|---|---|
| 2:16 | +3 |
| 2:30 | +1 |
| 3:00 | -1 |
| 4:15 | -1 |
| 4:49 | +2 |
| ... | ... |

PREDICTIVE SCALING FOR CLOUD APPLICATIONS

BACKGROUND

Computing clouds allow many applications to share the same underlying set of physical computing resources. Many computing clouds have resources in locations across the globe. Furthermore, many applications hosted in computing clouds now have global user bases. Increasing geographic dispersion of a cloud's resources and of the persons or clients that access a distributed application hosted by a cloud has led to sub-optimal provisioning of cloud resources to applications.

Consider that most clouds allow instances of an application to execute at many different cloud datacenters at any given time. Moreover, requests from clients to use the distributed application may originate at any time and from any location having network connectivity. Which application instances will service which client requests can vary. However, performance generally benefits from maximizing the proximity between clients and cloud-hosted instances of the application. Although network proximity and physical proximity are not necessarily equivalent, in most cases, the geographically closer a client is to an application instance, the better the performance. The geographic boundaries that a client-application session or exchange must traverse are often proxies for performance-impacting network boundaries.

As only appreciated by the inventors, merely dynamically adjusting the number of instances of an application to respond to current load is not an ideal solution. For one, responsive scaling inevitably involves lag between the computation load (e.g., number of client requests being serviced) and improved responsiveness. By the time an instance has been added to meet current demand, many clients may have already experienced degraded performance. Conversely, when load is dropping, responsive scaling may cause a cloud customer to have unneeded instances, thus increasing their cost with no commensurate benefit. Furthermore, merely scaling based on proximity may be insufficient and also requires possibly substantial resources to implement a continuous feedback-control loop. Geographic boundaries can coincide with legal constraints such as data privacy requirements; shifting an instance of a distributed application to a closer cluster of clients might increase overall client-application proximity but at the same time violate data privacy or location rules. Moreover, some prior solutions have scaled instances according to frequencies or rates of client requests. This approach may fail to align with performance as seen by requesting clients.

Techniques related to predictive scaling of instances of cloud applications based on telemetry observations of time, location, and performance of client/user requests are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A compute cloud hosts a distributed application and is configured to add or remove instances of the application at datacenters at disperse geographic regions. Operations of the application are captured in a telemetry stream. Each record in the telemetry stream indicates a time, client location, and performance measure for a corresponding client request. After pre-processing such as rounding the times, the telemetry records are passed to a frequent itemset mining algorithm that identifies frequent time-location pairs in the telemetry stream. The frequent time-location pairs are consolidated into encompassing frequent region time-range pairs. An aggregate performance measure is computed from the performance measures of the telemetry records that match a frequent region time-range pair. A recommended region and time for adding or removing instances of the application is computed based on the aggregate performance measure and the region time-range pair.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 7 shows an example of a time-region prediction output user interface provided by a cloud use portal.

DETAILED DESCRIPTION

Figure 1:
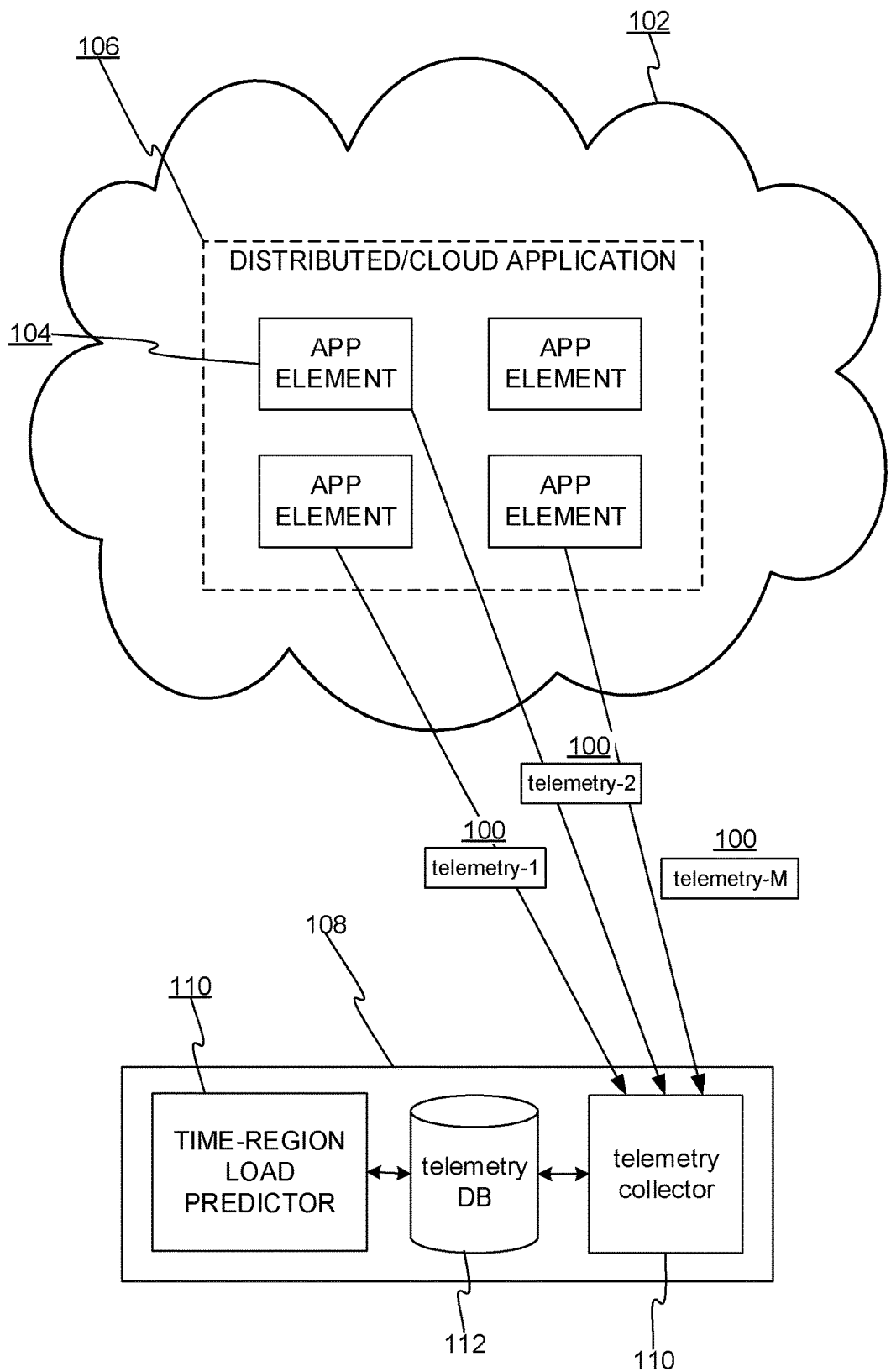
FIG. 1 shows an example of telemetry data flowing from sources to a collection point.

FIG. 1 shows an example of telemetry data flowing from sources to a collection point. A compute cloud 102 hosts instances or elements 104 of a distributed application 106. Each application element 104 forwards telemetry reports 100 to a telemetry service 108. A telemetry collector 110 collects the telemetry reports 100 and stores them in a telemetry database 112. The telemetry reports may be collections of telemetry data that include data (e.g., trace outputs) from many applications.

In one embodiment, the telemetry data consists of records of respective events or operations performed by the application. Event records may include may fields of data, but at the least should include fields that indicate performance of the respective operations (e.g., duration, latency, speed, etc.), identifiers identifying the operations, and one or more fields that can be interpreted as indicating whether a corresponding operation succeeded or failed. As discussed below, other fields may serve as signals for statistically predicting probabilities of failure rates, for instance parameters passed to an operation, metadata related to the operation, state of the application at the time of the operation, etc.

In one embodiment, heterogenous sources of telemetry data that bear on an application's performance may be collected and then collated and synchronized by the telemetry service 108. For instance, collected telemetry might include system log files with timestamped entries of operating system observations of events or operations invoked or performed by the application, application log or trace files with timestamped entries generated by the application (or element/instance) in correspondence with its activity, logs from web services, and so on. The telemetry service 108 may normalize and synchronize the telemetry data to form a cohesive diagnostic event stream chronology, preferably with timestamped entries.

For distributed applications, the telemetry service 108 may take telemetry reports from respective application instances and form a single dataset that treats the distributed application as a single unit; event records may or may not indicate their source, e.g., which application instances, hosts, cloud services, etc., generated which event records. It is also possible that the telemetry data to be used for failure-performance correlation may be from a single application or device. What is significant is that the telemetry data include information recorded for handling client requests, in particular dates/times, locations, and performance parameters of requests.

FIG. 1 also shows a time-region load predictor 110. The time-region load predictor 110 is a service provided by the compute cloud 102. As described below, the time-region load predictor 110 parses the telemetry records for a given application hosted by the compute cloud 102 to translate the telemetry data into predictions of where and when heavy client load is likely to occur. These prospective time-region load predictions can be provided to a user to enable the user to manually scale instances of the relevant application, to schedule instance scaling for specific times and regions (as per the predictions of the time-region load predictor 110), or to interact with the cloud fabric to automatically schedule instance scaling in advance of predicted increases and decreases of client load levels.

Figure 2:
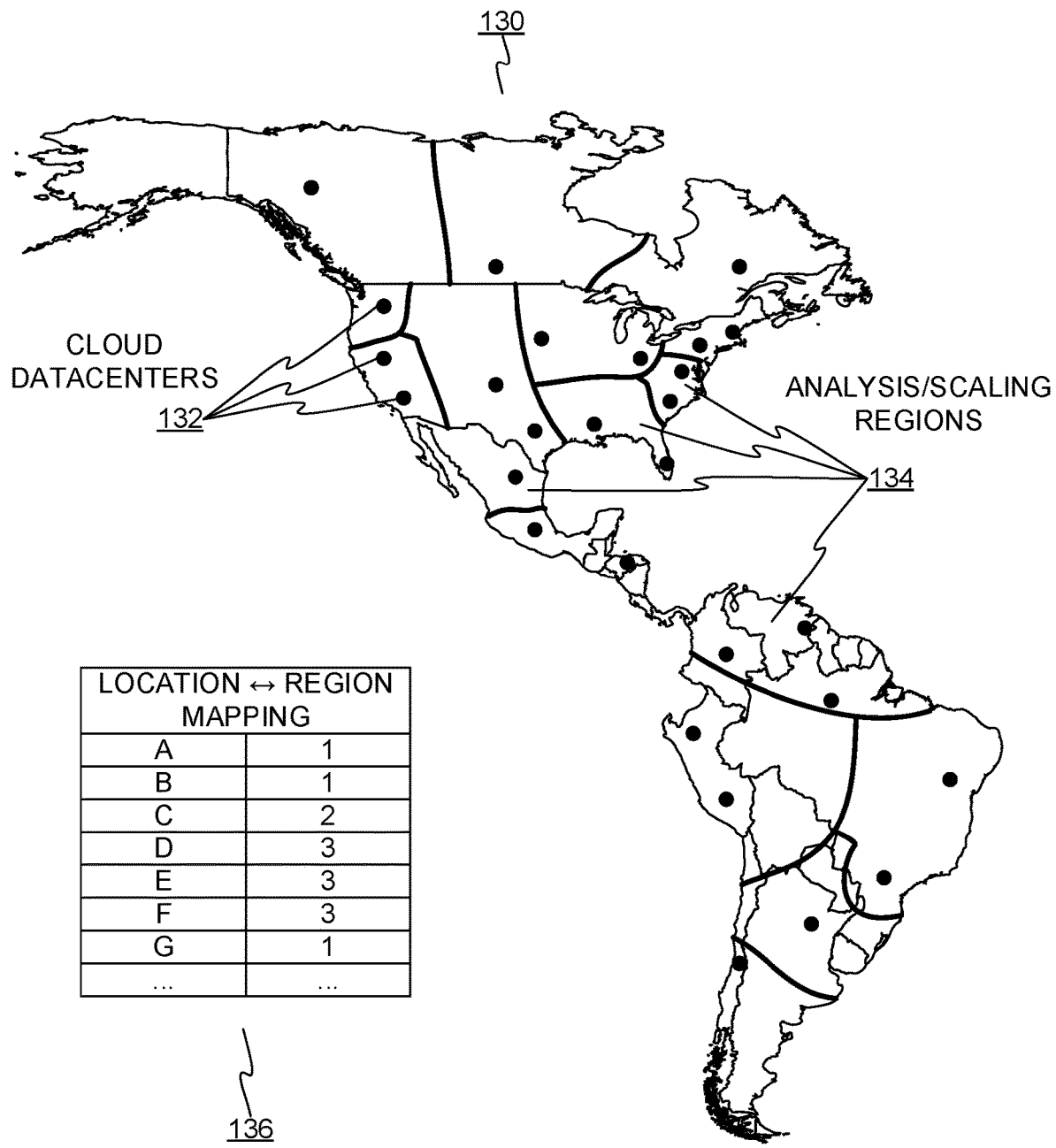
FIG. 2 shows a map of datacenters of a compute cloud.

FIG. 2 shows a map 130 of datacenters 132 (dots) of a compute cloud 102. The thick lines in FIG. 2 delineate regions 134 that are used for analysis and scaling of application instances, as discussed below. The compute cloud 102 includes a location-region mapping 136 that can map locations of client requests (where a client request originates) to the regions 134 used for analysis and scaling. The location-region mapping 136 may vary in form according to the types of locations of client requests in the telemetry data. If the telemetry data records geographic locations of requests (e.g., countries, cities, time zones, etc.), then the mapping 136 may map those locations to the regions 134. If the telemetry data records geographic coordinates, grid coordinates, or the like, then the location-region mapping 136 may be a more complex map with geometric definitions of regional boundaries; the mapping 136 is able to determine which region contains a given coordinate.

As can be seen in FIG. 2, a region 134 may contain any number of cloud datacenters 132. Regions 134 may be any arbitrary geographic unit and in most cases client requests may originate from many locations within a given region 134. The regions 134 in a location-region mapping may cover the majority of the inhabited planet surface or subparts such as continents, countries, etc. In one embodiment, a mapping 136 may be defined by a user for a particular application. That is, different mappings 136 are in use for different applications. In other embodiments, the fabric of the compute cloud may provide one or more pre-defined mappings that a user or customer can associate with an application.

Figure 3:
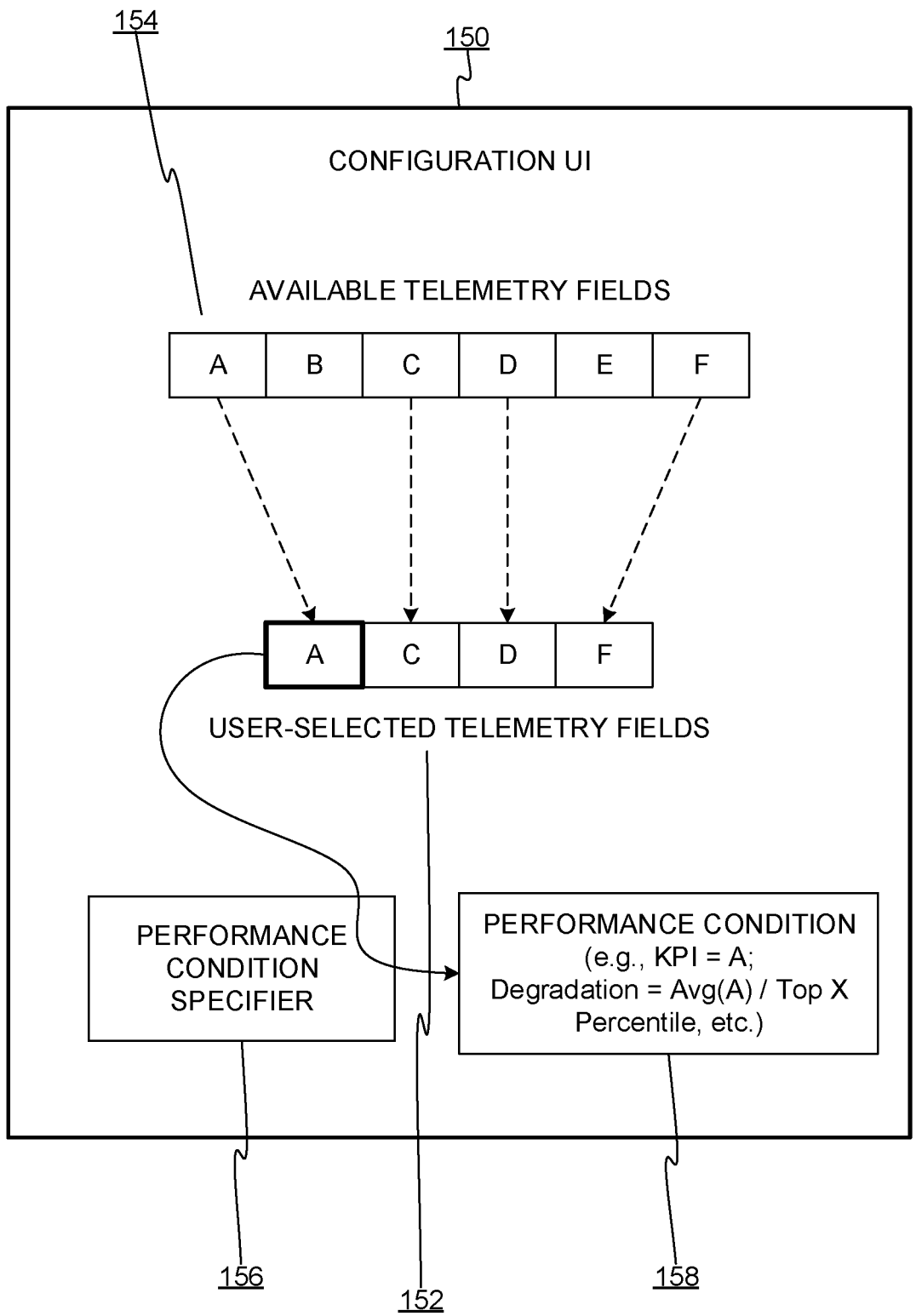
FIG. 3 shows a configuration user interface provided by the computing cloud.

FIG. 3 shows a configuration user interface 150 provided by the computing cloud for users to select and configure monitored telemetry fields 152 from among available telemetry fields 154. Through user interface elements (not shown), the user selects the telemetry source(s). The selected telemetry source(s) includes various available fields (e.g., "A" through "F"). The user interactively selects which telemetry fields will be collected and monitored (e.g., "A", "C", "D", and "F"). The user interface can also be configured to flag which telemetry fields have which purpose. For example, fields may be labeled as location-related fields, time/date fields, performance-measurement fields, etc. A performance condition specifier 156 may be displayed to enable interactive definition of a performance condition 158, i.e., a performance measure or key performance indicator (KPI) such as duration of handling a client request. The performance condition 158, discussed further below, may be any condition that can serve as a measure of the performance of the application when servicing a client request.

Figure 4:
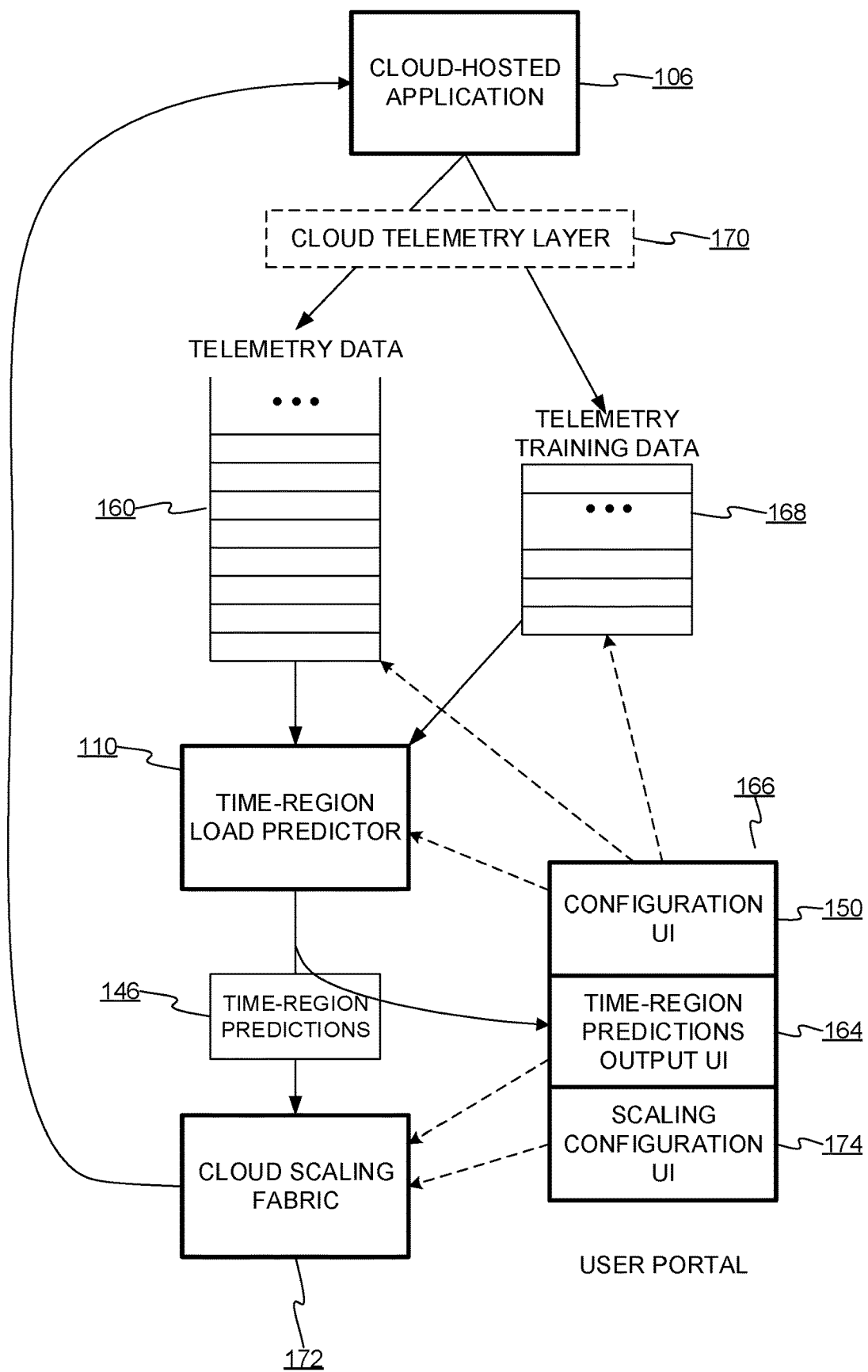
FIG. 4 shows how telemetry data flows from a cloud-hosted application, to a time-region load predictor.

FIG. 4 shows how telemetry data 160 flows from the cloud-hosted application 106, to the time-region load predictor 110, whose time-region predictions 146 may be provided directly to a scaling fabric 162 of the cloud or to a predictions output user interface 164. The configuration user interface 150, discussed above, is part of a user portal 166 provided by the computing cloud. The user portal 166 is generally available to each customer. The user portal 166 provides various user interface web pages or the like to enable each user to control and configure their use of cloud resources, build or install applications, etc. The user interfaces provided by the user portal 166 have uniform appearance and functionality among users but of course display data and control cloud resources and configuration in a user-specific manner.

The configuration user interface 150 is also used to configure training of the time-region load predictor 110. The configuration user interface 150 is manipulated by a user to select a source or set of telemetry training data 168 specific to the application 106. The telemetry training data 168 preferably covers a span of normal baseline performance of the application 106. Both the telemetry data 160 and the telemetry training data 168 are collected by a cloud telemetry layer 170 that is available for any cloud applications. The time-region load predictor 110 extracts the relevant time, location, and performance data from the training data 168 to compute a performance baseline for client requests handled by the application 106. The performance baseline is an aggregate measure derived from the user definition of the KPI as applied to the training data 168. The performance condition 158 is used by the algorithm of the time-region load predictor 110 to evaluate non-training telemetry data 106 to determine which client requests in the telemetry data were not carried out by the application 106 with sufficient performance.

The time-region load predictor 110 outputs time-region predictions 146, which indicate which regions and which times ("time" as used herein refers to times and/or dates) and which regions have been determined to have high load both in terms of volume and performance. The time-region predictions 146 may be supplied to a cloud scaling fabric 172 and/or to the time-region predictions output user interface 164. The cloud scaling fabric 172 consists of one or more components or services of the compute cloud 102. The cloud scaling fabric 172 creates or destroys instances of applications hosted by the compute cloud 102. A request to add or remove an instance may also specify a region 134 or cloud datacenter 132 where one or more instances are to be instantiated or terminated. Instancing functionality may be invoked by user code using a cloud application programming interface (API) or the like. In one embodiment, instancing is handled only at the application level.

The cloud scaling fabric 172 is also configured for either manual or automated application instance scaling. In the former case, a user uses the scaling configuration user interface 174 to manually add or remove application instances at designated regions. Instancing operations can be scheduled in advance by the user or performed in response to specific instancing requests. Instance scaling can also be performed automatically and in real-time based on instancing requests from the time-region load predictor 110. In another embodiment, the time-region predictions output user interface 164 is configured to make predictive/scheduled scaling recommendations based on the time-region predictions 146. As noted above, the time-region predictions 146 indicate times and regions of expected load and/or instancing recommendations.

Figure 5:
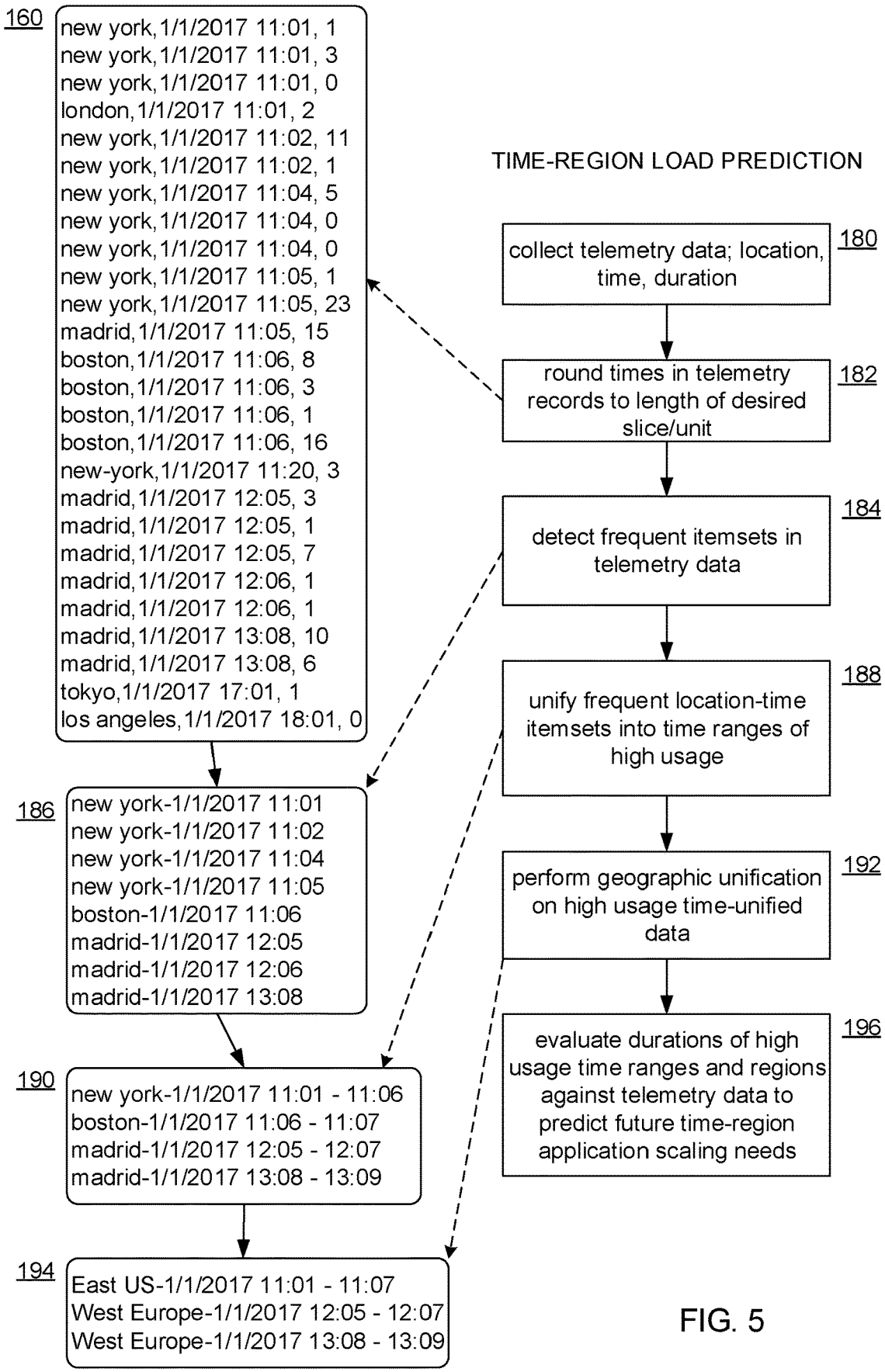
FIG. 5 shows an algorithm performed by the time-region load predictor.

FIG. 5 shows an algorithm performed by the time-region load predictor 110. The algorithm is illustrated with an example of telemetry data 160 for an arbitrary cloud-hosted application with geographically disperse instances and clients. Initially, at step 180, the telemetry data 160 is collected as discussed above. Whether a composite of sources (e.g., logs, trace files) or a single source, the telemetry data 160 will include records of respective requests from clients and serviced by the application 106. As shown in FIG. 5, each record includes fields for location, time, and performance, which in this example is duration (seconds) of completing each request. As noted above, the location may be a country, a coordinate, a city, etc. The location is preferably in a form that matches the location dimension of the location-region mapping 136.

At step 182 the times in the telemetry data 160 are rounded to a time slice or time bucket size. For example, if the records have request times in milliseconds, the times are rounded to seconds. Times can be rounded to any time length, for instance 10 seconds, 100 milliseconds, 5 minutes, etc. The value will depend on factors such as normal request rate or desired granularity. In the example of FIG. 5, the times are rounded to the nearest second. The performance field values (durations) may be retained (or omitted and reincorporated later); they are not needed until near the end of the algorithm.

At step 184 a key step of the algorithm is performed. At step 184 the prepared telemetry data is passed through a frequent itemset mining (FIM) algorithm to detect frequent itemsets in the telemetry data. Generally, an itemset is a set in which two data items co-occur. Step 184 employs sequential FIM mining to detect frequent occurrences of a same location and a same time slice/bucket (as per the rounding/bucketing at step 182). A number of known FIM algorithms may be used, such as the Apriori Algorithm or the FP-Growth Algorithm. For discussion, the Apriori Algorithm will be assumed. The Apriori algorithm assigns a score to each itemset which reflects frequency of that itemset in the telemetry data. A score of 1.0 for an itemset means that the itemset occurs in all of the telemetry data. A score of 0.1 means that the itemset appears in 10% of the telemetry data. A frequency threshold is used at step 184 to filter out any itemsets based on their frequency. For example, a threshold of 5% may be used. Only itemsets that appear in at least 5% of the telemetry data will be outputted from step 184. The threshold may be set manually, or it may be set heuristically, for instance using a feedback loop, a learning algorithm, or the like. Examples of frequent itemsets 186 detected by the frequent itemset algorithm are shown in FIG. 5. The frequent itemsets 186 the time-location combinations of client requests that occur with frequency above the threshold mentioned above.

Step 188 unifies the frequent itemsets 186 into time ranges 190 of high usage. In other words, where individual time slices of the frequent itemsets 186 cluster, they are condensed to larger encompassing ranges of time. Referring to the example data of FIG. 5, itemsets for the "New York" location are unified into a single range. Similarly, itemsets for "Madrid" are condensed into a time range. Note that the "madrid . . . 13:08-13:09" time range was not unified with the "madrid 12:05-12:07" time range because the differences in time are too great. Step 192 performs a similar function, but with respect to the locations of the unified time ranges 190. At step 192, the location-region mapping 136 is used to condense the unified location-based time ranges 190 into regional time ranges 194. Again, the notions of "location" and "region" are somewhat arbitrary. What is significant is that regions contain locations, but not the reverse. In the example of FIG. 5, locations are cities and regions are divisions of countries or continents. The location-region mapping 136 maps the "New York" and "Boston" locations to the "East US" region and the "Madrid" location to the "West Europe" region. Note that additional time unification may be performed if co-regional entries in the location-based time ranges 190 are not too far apart in time. The degree of time overlap (or a maximal time separation) may be user or system configured.

Figure 6:
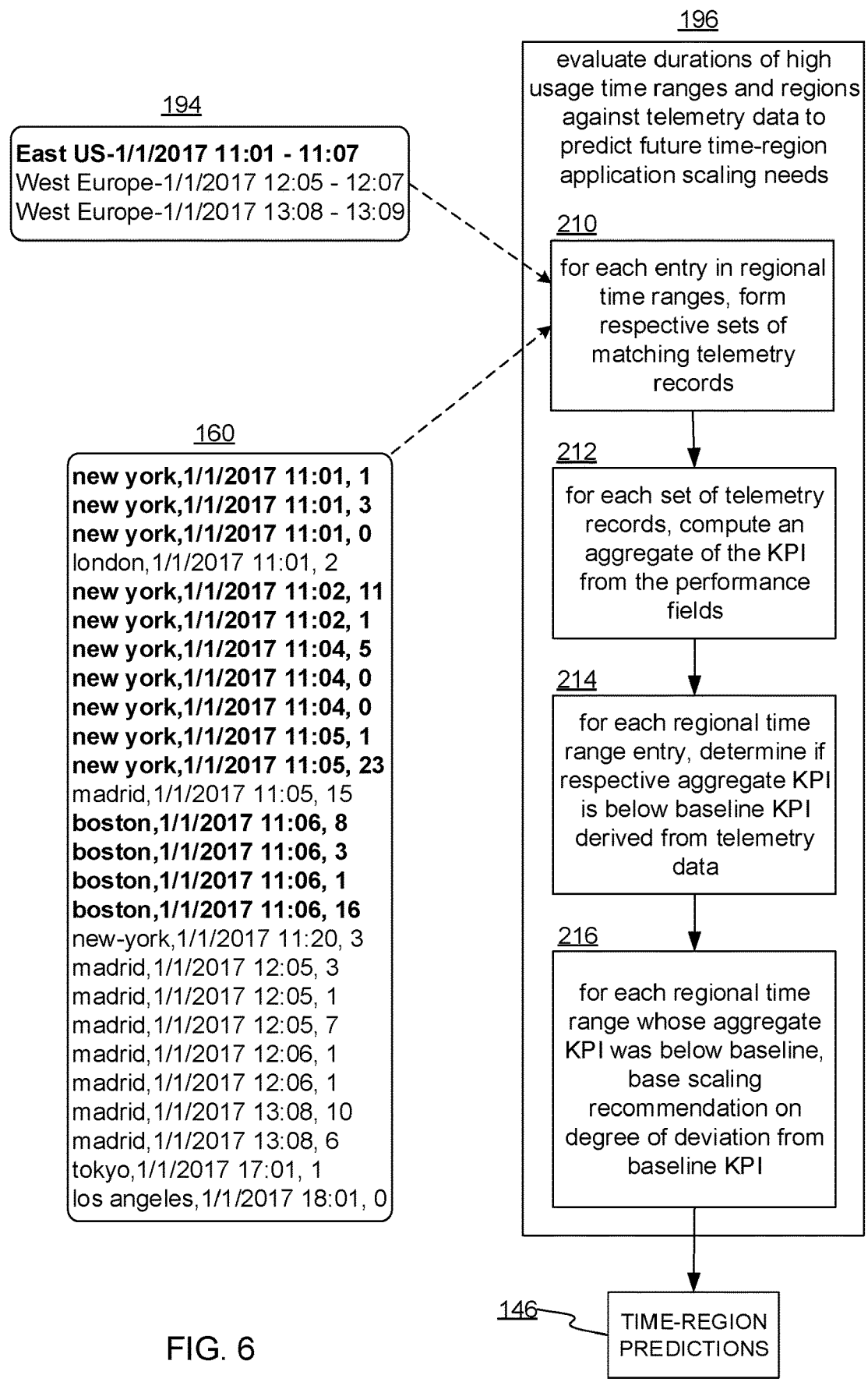
FIG. 6 shows details of how the regional time ranges are used to evaluate performance and make time-region load predictions and/or instancing recommendations.

At step 196 the regional time ranges are used to evaluate performance of the cloud application. FIG. 6 shows details of how the regional time ranges are used to evaluate performance and make time-region load predictions and/or instancing recommendations. At step 210, a set of telemetry records is formed for each entry in the regional time ranges 194. For example, the first entry (bold) is the "East US" region from "11:01" to "11:07". All of the entries in the telemetry data 160 that have a location in that region and that have a time within the time range are selected for the set of telemetry records (also bold) that correspond to the first entry in the regional time ranges 194. Such a telemetry set is formed for each entry in the regional time ranges 194. Telemetry ranges that do not match an entry in the regional time ranges 194 are ignored.

At step 212, each set of telemetry records formed at step 210 are processed to compute a respective aggregate KPI from the performance fields in the relevant set of telemetry records. In other words, an aggregate performance measure is computed for each regional time range 194 from its respective telemetry data set. The aggregate performance measure may be any type of statistic such as an average, a weighted average, etc.

At step 214, the aggregate performances of the respective regional time ranges 194 are compared to the baseline performance measure computed from the telemetry training data 168. The comparison may be done by simple comparison, e.g., determining whether an aggregate request/completion duration exceeds the baseline request/completion duration. Another approach that does not use an aggregate performance measure is to determine whether a threshold percentage of the telemetry records in a set of telemetry records individually fail to meet the baseline performance level. For example, if the baseline performance is 2 seconds duration per request, and 50% of the records have a duration exceeding 2 seconds, then the set, and its corresponding regional time range, is deemed to have insufficient performance. Similarly, a degree of insufficiency for a regional time range may be scaled to the degree to which the regional time range's telemetry data fails meet the baseline. Continuing the example above, the greater the percentage of telemetry records for a regional time range fail to meet the baseline performance, the greater the need for instance scaling for the regional time range.

Although a global baseline performance standard may be used, as discussed above, more sophisticated baseline comparisons may be used. The baseline performance to be used for a given regional time range can be a function of variables such as the region, the time, and/or other factors associated with performance. It may be the case that the compute cloud has patterns of global load that can be accounted for with dynamic baselines. If global load has a pattern of fluctuation, that pattern can be captured in the training data and the baseline performance used to evaluate a regional time range can be computed based on the time, the region, etc.

At step 216, recommendations are computed for each regional time range with insufficient aggregate performance. For each deficient regional time range, the degree of insufficient performance is translated into instance a scaling recommendation. The actual scaling recommendations will largely depend on specifics such as the number of instances a particular application needs to provide adequate service, the budget of the user that is purchasing the cloud resources to host their application, past experience, etc. In some cases, instances may need to be scaled more gradually or steeply from one region to the next, for example due to factors such as network performance in different regions.

In one embodiment, the instance scaling recommendations may be proportional, i.e., proportions of total resources of instances available to the corresponding cloud user/subscriber. Although discussion above addresses upward scaling, downward scaling is equally valuable and may be implemented with the same techniques. The degree to which a regional time range has performance below the baseline performance of the distributed application can be used to recommend decommissioning or terminating instances. To summarize, the form of the time-region predictions 146 can vary, whether for upward or downward adjustment. For example, the time-region predictions 146 may be recommendations for numbers of application instances, scalar values that the user can translate to instancing decisions, etc. Heuristics can be used to dynamically map the raw performance data of regional time ranges to actual instancing recommendations.

FIG. 7 shows an example of the time-region prediction output user interface 164 provided by the cloud use portal 166. The output user interface 164 receives the time-region predictions 146 and presents them in a way that helps the user make decisions about adding or removing instances for their application. The example shown in FIG. 7 includes a separate recommendation panel 230 for each time-region that was reported as being sufficiently above and/or below the baseline performance. The recommendations may be specific to times or time ranges. The recommendations, as noted above, may be in the form of deltas in the number of application instances, the number of recommended total instances for a time-region, a recommended proportion of the cloud-wide number of instances, and so forth. The user interface may include interactive elements to allow the user to conveniently implement the recommendations. For example, each recommendation panel 230 (or each row thereof) may have a drop-down, button, or the like that can be actuated to cause the row or panel's recommendation to be automatically scheduled for implementation at the corresponding time and for the corresponding region. If the time-region predictions output user interface 164 is configured for interactive acceptance of recommendations, as shown in FIG. 4, the user interface communicates with an API of the cloud scaling fabric 172 to carry out the scaling recommendations. In another embodiment, the time-region predictions output user interface 164 is not interactive, and instead, the user uses the scaling configuration user interface 174 to manually schedule corresponding scaling events.

Although embodiments above use the lengths of time that the application takes to service respective client requests, other performance measures may be used. Instead of duration, measures of computation, storage, bandwidth, monetary cost, and so forth may all be used as performance variables that can be evaluated in the same fashion as the durations of time required to complete client requests.

The compute cloud includes a scheduling mechanism in the cloud scaling fabric 172. A user may use the user portal to instantiate a scaling schedule for a designated one of the user's cloud applications. The schedule includes at least two dimensions; time and region. The scaling schedule is filled out either manually with the scaling configuration user interface 174, and/or automatically by interactively adapting the time-region predictions 146 displayed in the time-region predictions output user interface 164, as discussed above. Entries in the scaling schedule may specify proportions of total instances (of the application) for respective region-time entries, and/or they may specify absolute counts (or deltas) for respective region-time entries. The cloud scaling fabric 172 then follows the schedule to create, remove, or migrate instances at the times and regions designated by the scaling schedule.

In one embodiment, times for instantiating and/or de-instantiating instances of the application are scheduled with some lead time. If a region and time range has been identified as having sufficiently frequent client requests and as being sufficiently under or over provisioned with application instances, times for correspondingly recommended or scheduled times are set with some offset. For example, if region X is identified as having insufficient instances at 10:00 a.m., then the scheduled (or recommended) time may be set to five minutes earlier; at 9:55 a.m. This allows the instances to be available when the increased client load is predicted. Conversely, if region X is identified as having too many instances at 10:00 a.m., the recommended or scheduled time may be five minutes later; at 10:05 a.m., thus allowing tapering or accounting for slight deviations in the timing of actual load changes.

Figure 8:
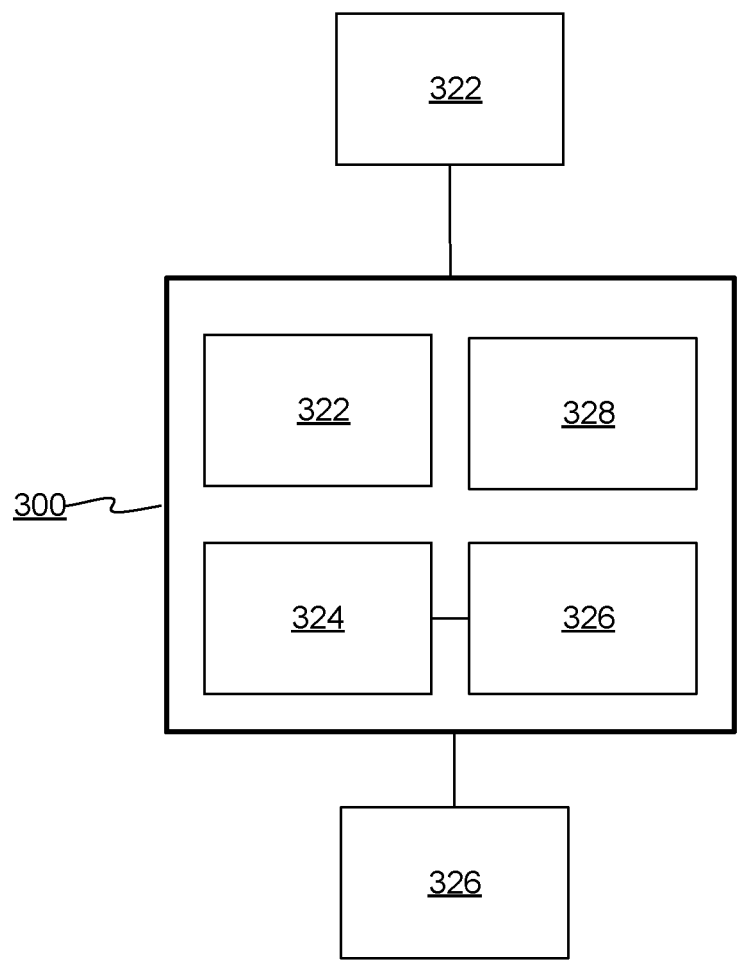
FIG. 8 shows details of a computing device on which embodiments may be implemented.

FIG. 8 shows details of a computing device 300 on which embodiments described above may be implemented. The computing device 300 is an example of a client device or physical (or virtual) server devices that make up a compute cloud. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computing devices, the method comprising:
    executing a distributed application on a compute cloud, wherein instances of the application execute at datacenters of the compute cloud, the datacenters at respective different geographic regions, and wherein clients submit client requests to the application via a network;
    collecting, by the compute cloud, telemetry data comprising telemetry records that respectively correspond to the client requests, each telemetry record comprising indicia of a corresponding geographic location of a corresponding client, a time of a corresponding client request, and a performance field corresponding to an amount of time to perform the corresponding client request by the distributed application, wherein the geographic locations of the telemetry records correspond to a plurality of regions;
    applying a frequent itemset mining algorithm to compute frequencies of time-location co-occurrences of client requests in the telemetry data;
    selecting time-location co-occurrences having frequencies above a threshold;
    based on a mapping that maps the geographic locations of the telemetry records to the plurality of regions, consolidating the frequencies of the selected time-location co-occurrences of client requests in the telemetry data into frequencies of corresponding region time-range pairs, and selecting a set of the region time-range pairs based on the frequencies thereof; and
    for a selected frequent region time-range pair, based on the performance fields of the telemetry records encompassed by both the region and the time-range of the selected frequent region time-range pair, determining whether an aggregate performance of the selected frequent region time-range pair deviates from a baseline performance metric associated with the application.

2. A method according to claim 1, further comprising outputting a value corresponding to the determining, the value comprising a scalar or proportional value that corresponds to the extent of deviation from the baseline performance metric.

3. A method according to claim 2, further comprising, before the time-range of the frequent region time-range pair, scheduling instantiation or de-instantiation of an instance of the distributed application according to the region and time-range of the frequent region time-range pair.

4. A method according to claim 3, wherein a number of instances of the distributed application to be instantiated or removed corresponds to the outputted value.

5. A method according to claim 1, further comprising providing a user portal comprising a user interface, the user interface configured to enable configuration of the telemetry data and to display a result of the determining.

6. A method according to claim 1, further comprising computing the baseline performance metric based on training telemetry data corresponding to other client requests serviced by the application.

7. A method according to claim 1, further comprising displaying a user interface comprising indicia of the region and the time-range of the selected frequent region time-range pair.

8. A method according to claim 7, further comprising responding to actuation of a user interface element of the user interface by scheduling an instantiation or de-instantiation of an instance of the distributed application within the region and at a time that is based on the time-range of the frequent region time-range pair.

9. Computer readable storage hardware storing instructions configured to cause a computing device to perform a process, the process comprising:
    receiving a telemetry stream comprised of telemetry records representing respective performances of an operation by an application hosted by a compute cloud responsive to client device requests, the compute cloud configured to instantiate and de-instantiate instances of the application, each telemetry record comprising a respective performance measure of an invocation of the operation, each telemetry record comprising a respective location, and each telemetry record comprising a time corresponding to a respective invocation of the operation, wherein the locations of the telemetry records correspond to a plurality of regions, and wherein the performance measures of the telemetry records comprise times for the application to service the client device requests;
    passing the telemetry stream to a frequent itemset mining algorithm that determines frequencies of co-occurring location-time itemsets among the telemetry records and identifies location-time itemsets having time and location co-occurrence frequencies above a threshold;
    selecting the identified location-time itemsets having time and location co-occurrence frequencies above the threshold;
    based on a mapping that maps the locations in the telemetry records to the plurality of regions, consolidating the frequencies of the selected location-time itemsets into frequencies of corresponding frequent region-time pairs; and scheduling, for times and regions based on the times and regions of the frequent region-time pairs, instantiations or de-instantiations of instances of the application by the compute cloud.

10. Computer readable storage hardware according to claim 9, the process further comprising selecting a subset of the frequent region-time pairs based on aggregate performance measures of the respective selected location-time itemsets, the scheduled times and regions corresponding to the times and regions of the frequent region-time pairs in the subset.

11. Computer readable storage hardware according to claim 9, wherein the process further comprises: providing a user interface and configuring the telemetry stream according to the user interface.

12. Computer readable storage hardware according to claim 10, wherein the aggregate performance measures comprise respective durations to perform the operation.

13. Computer readable storage hardware according to claim 9, wherein the consolidating is based on a mapping that maps locations of the telemetry records to the regions of the frequent region-time pairs.

14. Computer readable storage hardware according to claim 9, the process further comprising: determining, for a frequent region-time pair, a value, the value corresponding to a deviation of a baseline performance measure from an aggregate performance measure, the aggregate performance measure computed from telemetry records selected based on having locations within the region of the frequent region-time pair and having times that correspond to the time of the frequent region-time pair, wherein the value corresponds to a number of instances of the application that are to be instantiated or de-instantiated at one of the scheduled regions and times.

15. A method performed by a compute cloud comprised of a plurality of server devices distributed among datacenters at respective geographic regions, the method comprising:
hosting an application and instantiating and de-instantiating instances of the application at the datacenters, the application configured to perform an operation responsive to requests from client devices communicating with the compute cloud;
receiving a telemetry stream comprising entries that respectively represent invocations of the operation by the requests, each entry comprising a geographic location of a corresponding client device when a corresponding request was made by the corresponding client device, a time of the corresponding request, and a performance measure for the corresponding request, the performance measure corresponding to an amount of time to perform the corresponding request, wherein the geographic locations of the entries correspond to a plurality of regions;
applying a frequent itemset mining algorithm to the entires to compute frequencies of time and location co-occurrences in the entires;
selecting the time and location co-occurrences having frequencies above a threshold;
computing frequencies of respective region-specific time-range pairs from the frequencies of the selected time and location co-occurrences of the entries, each region-specific time-range pair corresponding to a geographic region and a time-range;
selecting a set of region-specific time-range pairs based on the frequencies thereof;
computing aggregate performance measures of the selected region-specific time-range pairs based on the performance measures of the corresponding entries; and
displaying recommended regions and times for instantiating or de-instantiating instances of the application based on the aggregate performance measures and based on the regions and time-ranges of the selected region-specific time-range pairs.

16. A method according to claim 15, wherein the displaying comprises displaying a user interface provided by a user portal of the compute cloud.

17. A method according to claim 15, wherein a user portal of the compute cloud is configured to respond to user inputs directed thereto by:
configuring the telemetry stream, and
configuring how the aggregate performance measures are computed.

18. A method according to claim 15, further comprising: computing a baseline performance measure from another telemetry stream, and deriving the recommended regions and times by evaluating the aggregate performance measures against the baseline performance measure.

19. A method according to claim 15, further comprising rounding the times of the respective entries.

20. A method according to claim 15, wherein the compute cloud comprises datacenters in the recommended regions, respectively.

* * * * *